United States Patent
Estreemera et al.

(10) Patent No.: US 11,606,680 B2
(45) Date of Patent: Mar. 14, 2023

(54) METHOD AND DEVICE FOR DISCRIMINATING ONE OF A GROUP OF NFC TRANSMITTERS

(71) Applicant: Capital One Services, LLC, McLean, VA (US)

(72) Inventors: Ruby Rue Roman Estreemera, McLean, VA (US); Deborah Nally, Williamsburg, VA (US); Laith Hallaq, Manassas Park, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 156 days.

(21) Appl. No.: 17/159,768

(22) Filed: Jan. 27, 2021

(65) Prior Publication Data

US 2022/0240068 A1 Jul. 28, 2022

(51) Int. Cl.
*H04W 4/80* (2018.01)
*H04B 5/00* (2006.01)
*G06K 19/06* (2006.01)

(52) U.S. Cl.
CPC ............ *H04W 4/80* (2018.02); *H04B 5/0031* (2013.01)

(58) Field of Classification Search
None
See application file for complete search history.

(56) References Cited

U.S. PATENT DOCUMENTS 6,839,035 B1   1/2005   Addonisio et al.
7,170,415 B2 *  1/2007  Forster ............... G06K 19/0739
                                                         340/572.9

(Continued)

FOREIGN PATENT DOCUMENTS

CA        2812210 A1    3/2012
CA        2769379 A1    8/2012
(Continued)

OTHER PUBLICATIONS

International Search Report and the Written Opinion of the International Searching Authority issued in related PCT Application No. PCT/US2022/013632, dated Jun. 3, 2022.

*Primary Examiner* — Tuan A Tran
(74) *Attorney, Agent, or Firm* — Hunton Andrews Kurth LLP

(57) ABSTRACT

A method is provided for differentiating one of a plurality of unpowered NFC transmitting devices for NFC communication with a receiving device. Each NFC transmitting device has a transmitter NFC interface and an NFC communication range. A range extending device has a power source, a transmitter communication interface, a range extender antenna, and an amplifier. One of the transmitting devices is selected and the range extending device is connected to it so that the transmitter communication interface engages the transmitter NFC interface of the selected transmitting device. This action serves to establish an extended communication range for the selected NFC transmitting device. The NFC transmitting devices are then positioned at a distance from the receiving device that is within the extended communication range, but outside the communication ranges of the other NFC transmitting devices. NFC communication is then established between the selected NFC transmitting device and the receiving device.

15 Claims, 12 Drawing Sheets

(56) References Cited

U.S. PATENT DOCUMENTS

| | | | | |
|---|---|---|---|---|
| 7,209,042 | B2* | 4/2007 | Martin | G06K 19/0717 340/572.1 |
| 7,605,708 | B2* | 10/2009 | Cote | G06K 19/07749 340/568.1 |
| 7,633,394 | B2* | 12/2009 | Forster | G06K 19/0724 340/572.9 |
| 8,070,057 | B2* | 12/2011 | Jain | H01Q 1/2225 235/375 |
| 8,648,767 | B2* | 2/2014 | Takahashi | G06K 7/10336 343/742 |
| 8,915,447 | B2* | 12/2014 | Jain | H04M 15/68 235/492 |
| 8,925,827 | B2* | 1/2015 | Jain | G06Q 20/352 235/492 |
| 9,000,925 | B2* | 4/2015 | Forster | G06K 19/07749 340/568.1 |
| 9,016,589 | B2* | 4/2015 | Jain | H04M 17/103 235/487 |
| 9,106,647 | B2* | 8/2015 | Jain | G06Q 20/3223 |
| 9,152,911 | B2* | 10/2015 | Jain | G06K 19/07749 |
| 9,195,931 | B2* | 11/2015 | Jain | G06K 19/07749 |
| 9,304,555 | B2* | 4/2016 | Jain | G06Q 20/352 |
| 9,311,586 | B2* | 4/2016 | Robinette | G08B 21/0219 |
| 9,311,766 | B2* | 4/2016 | Jain | G06K 19/07749 |
| 9,384,480 | B2* | 7/2016 | Jain | G06K 19/07739 |
| 9,418,362 | B2* | 8/2016 | Jain | G06Q 20/3265 |
| 9,633,299 | B2* | 4/2017 | Liu | G06K 19/07773 |
| 9,740,342 | B2 | 8/2017 | Paulsen et al. | |
| 9,978,009 | B1* | 5/2018 | Geist | G06K 19/0727 |
| 10,418,711 | B2* | 9/2019 | Geist | H01Q 7/08 |
| 10,833,732 | B2* | 11/2020 | Richter | H04B 5/0012 |
| 10,861,003 | B1 | 12/2020 | Rezayee | |
| 11,068,768 | B1* | 7/2021 | Gupta | G06K 19/0719 |
| 11,104,178 | B2* | 8/2021 | Roche | B32B 27/306 |
| 11,157,791 | B2* | 10/2021 | Virtanen | G06K 19/07794 |

| | | | |
|---|---|---|---|
| 2009/0170431 | A1 | 7/2009 | Pering et al. |
| 2010/0012721 | A1 | 1/2010 | Jain et al. |
| 2012/0038445 | A1 | 2/2012 | Finn |
| 2012/0196529 | A1 | 8/2012 | Huomo et al. |
| 2012/0220224 | A1 | 8/2012 | Walker |
| 2012/0225621 | A1 | 9/2012 | Li et al. |
| 2013/0189923 | A1 | 7/2013 | Lewin |
| 2013/0196595 | A1 | 8/2013 | Byrne et al. |
| 2014/0065948 | A1 | 3/2014 | Huang |
| 2014/0087655 | A1 | 3/2014 | Hall et al. |
| 2014/0129425 | A1 | 5/2014 | Yang et al. |
| 2014/0176306 | A1 | 6/2014 | Lee et al. |
| 2014/0370804 | A1 | 12/2014 | Dorning |
| 2015/0111494 | A1 | 4/2015 | Yeh |
| 2015/0278661 | A1 | 10/2015 | Hasegawa |
| 2016/0072556 | A1 | 3/2016 | Lee et al. |
| 2017/0161530 | A1 | 6/2017 | Turner et al. |
| 2018/0091193 | A1 | 3/2018 | Hagedorn |
| 2019/0332912 | A1 | 10/2019 | Walker |
| 2020/0334510 | A1* | 10/2020 | Hu ............... G06K 19/07728 |

FOREIGN PATENT DOCUMENTS

| | | |
|---|---|---|
| CA | 2837095 C | 7/2016 |
| EP | 2221984 A1 | 8/2010 |
| EP | 2618497 A1 | 7/2013 |
| EP | 2621223 A1 | 7/2013 |
| EP | 2680617 A1 | 1/2014 |
| EP | 2779779 | 9/2014 |
| EP | 2933758 A1 | 10/2015 |
| EP | 2861037 B1 | 1/2017 |
| EP | 2945298 B1 | 5/2017 |
| WO | 2010018468 A1 | 2/2010 |
| WO | 2011103684 A1 | 9/2011 |
| WO | 2013110168 A1 | 8/2013 |
| WO | 2015144800 A1 | 10/2015 |
| WO | 2016025112 A1 | 2/2016 |
| WO | 2016100112 A1 | 6/2016 |

* cited by examiner

METHOD AND DEVICE FOR DISCRIMINATING ONE OF A GROUP OF NFC TRANSMITTERS

FIELD OF THE INVENTION

This disclosure relates generally to systems and methods for near field communication (NFC), and more specifically, to a system and method for effecting communication between an NFC receiving device and a particular one of a group of NFC transmitting devices.

BACKGROUND OF THE INVENTION

Financial transaction cards have become the primary means of carrying out in-person transactions in today's society and the technology associated with and embedded into these cards has increased dramatically. Many of these cards are provided with the capability of conducting transactions via near field communication. Typically, these cards are provided with an NFC transmitter that is powered by the action of bringing the card within a magnetic field generated by an NFC receiver (e.g., of a merchant transaction processor). The transmitter can then be used by the card's on-board data processor to establish communication with the receiver and carry out a transaction. This capability is particularly convenient because a user need not even remove the card from their wallet to conduct a purchase transaction.

This convenience may disappear, however, when a user has more than one NFC-capable transaction card in their wallet at the same time and the receiver is unable to identify the correct card to carry out a transaction.

SUMMARY OF THE INVENTION

An illustrative aspect of the invention provides a method of differentiating one of a plurality of unpowered NFC transmitting devices for use in establishing NFC communication with an NFC receiving device. Each NFC transmitting device has a body member, a data processor, a memory, an antenna, and a transmitter NFC interface. Each NFC transmitting device also has an NFC communication range. The method comprises providing a range extending device having a power source, a transmitter communication interface configured for engaging the transmitter NFC interface, a range extender antenna, and an amplifier configured for amplifying an NFC transmitting device signal when the range extending device is connected to one of the NFC transmitting devices and said NFC transmitting device is activated by an NFC receiving device. The method further comprises selecting one of the plurality of NFC transmitting devices and removably connecting the range extending device to the selected NFC transmitting device so that the transmitter communication interface engages the transmitter NFC interface of the selected transmitting device. This action serves to establish an extended communication range for the selected NFC transmitting device. The method still further comprises positioning the plurality of NFC transmitting devices at a first distance from a first NFC receiving device, the distance being within the extended communication range, but outside the communication ranges of the others of the plurality of NFC transmitting devices. The method also comprises establishing NFC communication between the selected NFC transmitting device and the first NFC receiving device.

Another aspect of the invention provides a method of extending a near field communication range of an unpowered NFC transmitting device having a body member, a data processor, a memory, an antenna, and a transmitter NFC interface. The method comprises providing a range extending device having a power source, a transmitter communication interface configured for engaging the transmitter NFC interface, and an amplifier configured for amplifying an NFC transmitting device signal when the range extending device is connected to the NFC transmitting device and the NFC transmitting device is activated by an NFC receiving device. The method further comprises connecting the range extending device to the selected NFC transmitting device so that the transmitter communication interface engages the transmitter NFC interface of the selected transmitting device, thereby establishing an extended communication range for the NFC transmitting device.

Another aspect of the invention provides a range extension device for use in conjunction with an unpowered near field communication transmitting device having a body member, a data processor, a memory, an antenna, and a transmitter NFC interface. The range extension device comprises a transmitter engagement body, a power source, a transmitter communication interface disposed on the transmitter engagement body and configured for engaging the transmitter NFC interface, and a range extender antenna. The range extender further comprises an amplifier connected to the power source and the range extender antenna. The amplifier and the range extender antenna are collectively configured to receive and amplify an NFC transmitting device signal when the range extending device is connected to the NFC transmitting device and the NFC transmitting device is activated by an NFC receiving device.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and network environments, it will be understood that the invention is not limited to these embodiments and environments. On the contrary, it is contemplated that various alternatives, modifications and equivalents are included within the spirit and scope of the invention as described.

While particular examples and embodiments of the invention are directed to NFC-capable transaction cards and the use of such cards in carrying out purchase and other financial transactions, the methods of the invention may be applied to any instance where NFC communication is to be established between an NFC receiver and a particular one of a group of closely spaced NFC transmitters.

Figure 1:
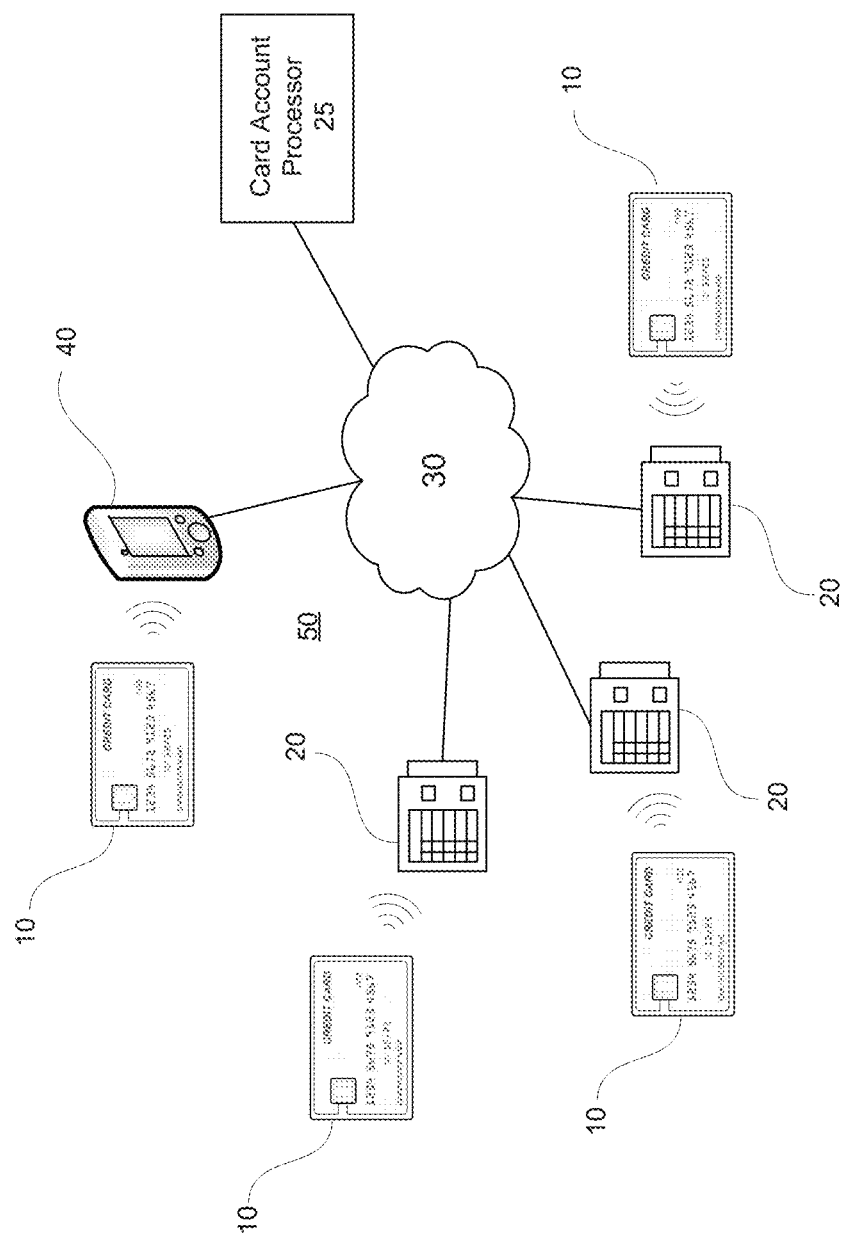
FIG. 1 is a schematic representation of a transaction card processing system usable in conjunction with embodiments of the invention.
Figure 2:
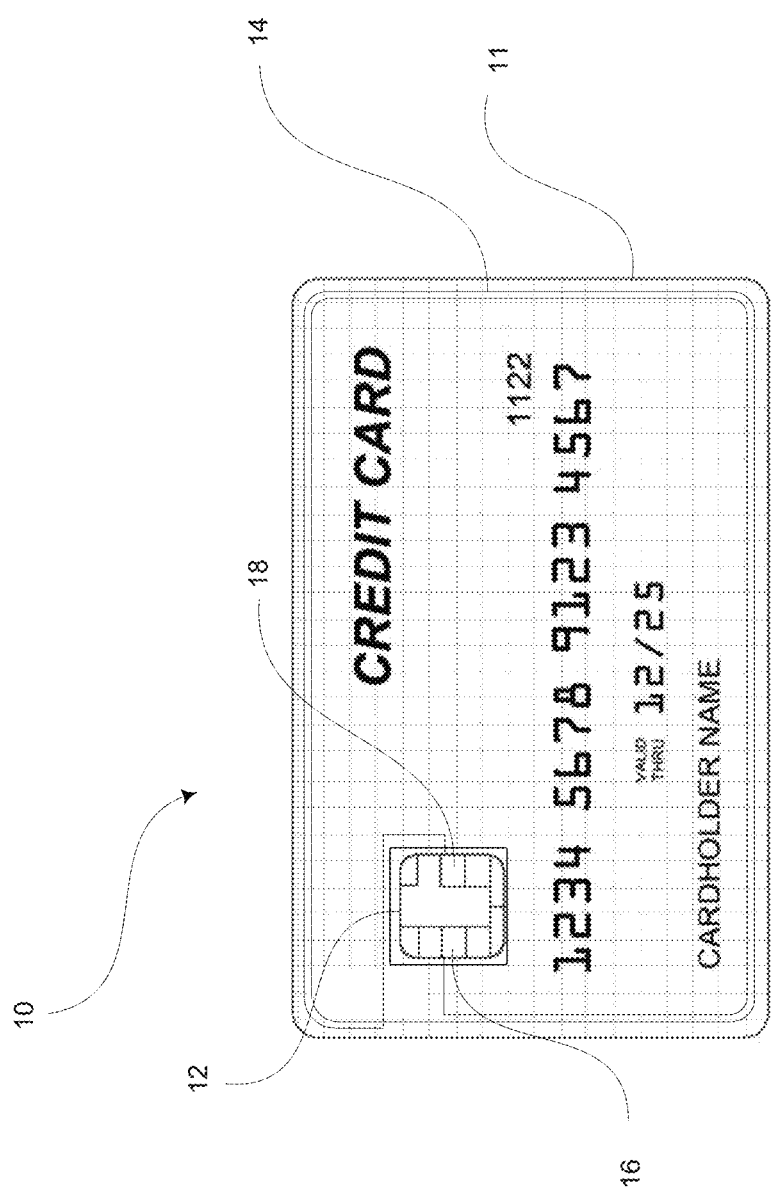
FIG. 2 is an illustration of a transaction card usable in conjunction with embodiments of the invention.

As used herein, the term "transaction card" refers to any identification or payment card associated with a user or user account. This may include, in particular, a credit card, debit card, or gift card, any of which may be issued by a service provider. It may also include smart transaction cards having an on-board processor and NFC communication capability, which have become common vehicles for carrying out purchase and other financial transactions. FIG. 1 provides a schematic representation of a transaction processing system 50 that uses NFC-capable transaction cards 10 to carry out transactions with NFC-enabled merchant transaction processing devices 20 and, in some cases, with NFC-enabled user devices 40 (e.g., a mobile phone). As shown in FIG. 2, a typical transaction card 10 includes a data processing chip 12 and an NFC antenna 14 attached to a card body 11. When the transaction card 10 is immersed in the magnetic field generated by an NFC receiver, a sufficient current to power the data processing chip 12 is generated. The chip 12 may then transmit information to the NFC receiver.

Figure 3:
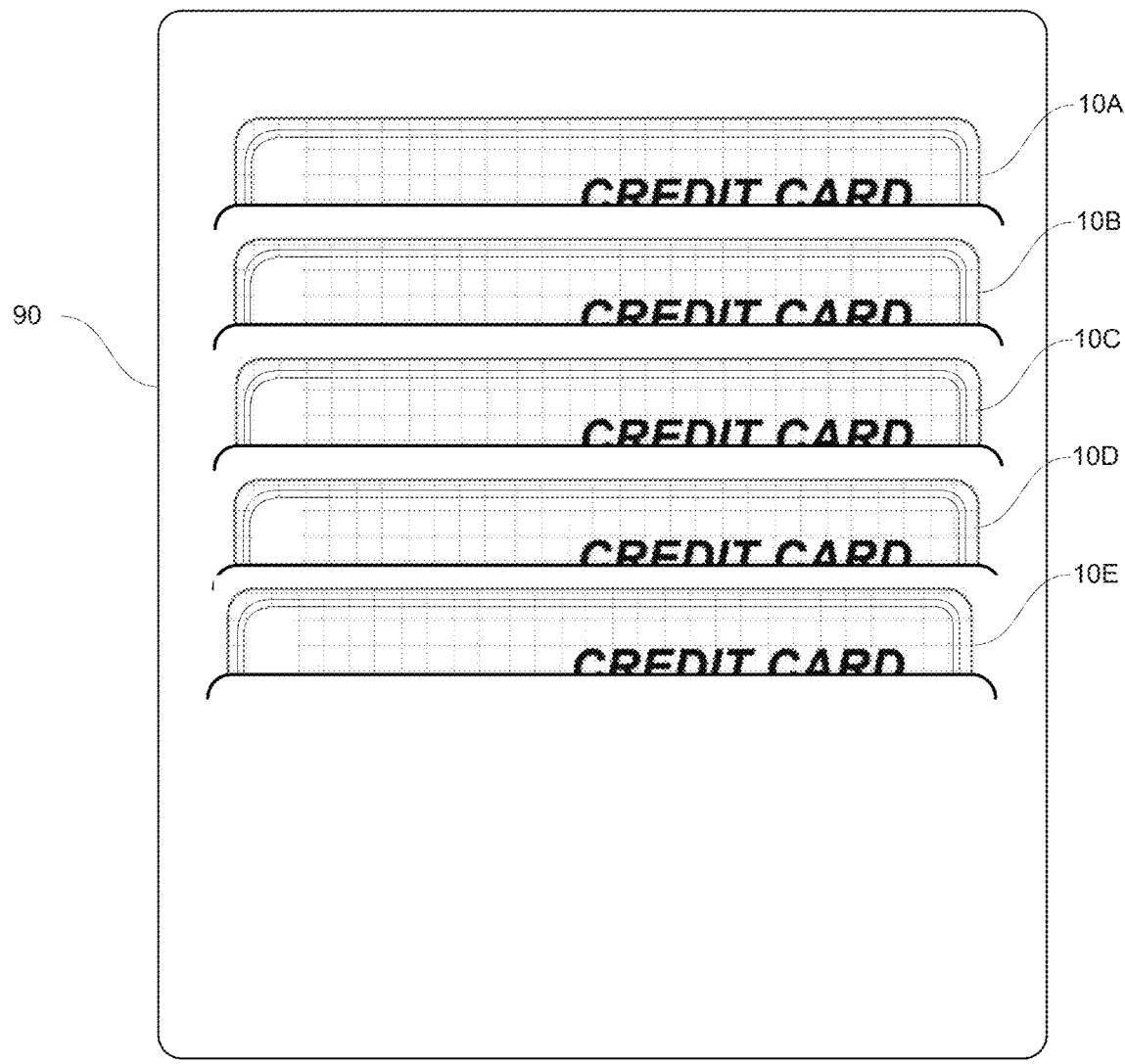
FIG. 3 is an illustration of a card case having a plurality of NFC transaction cards stored therein.
Figure 4:
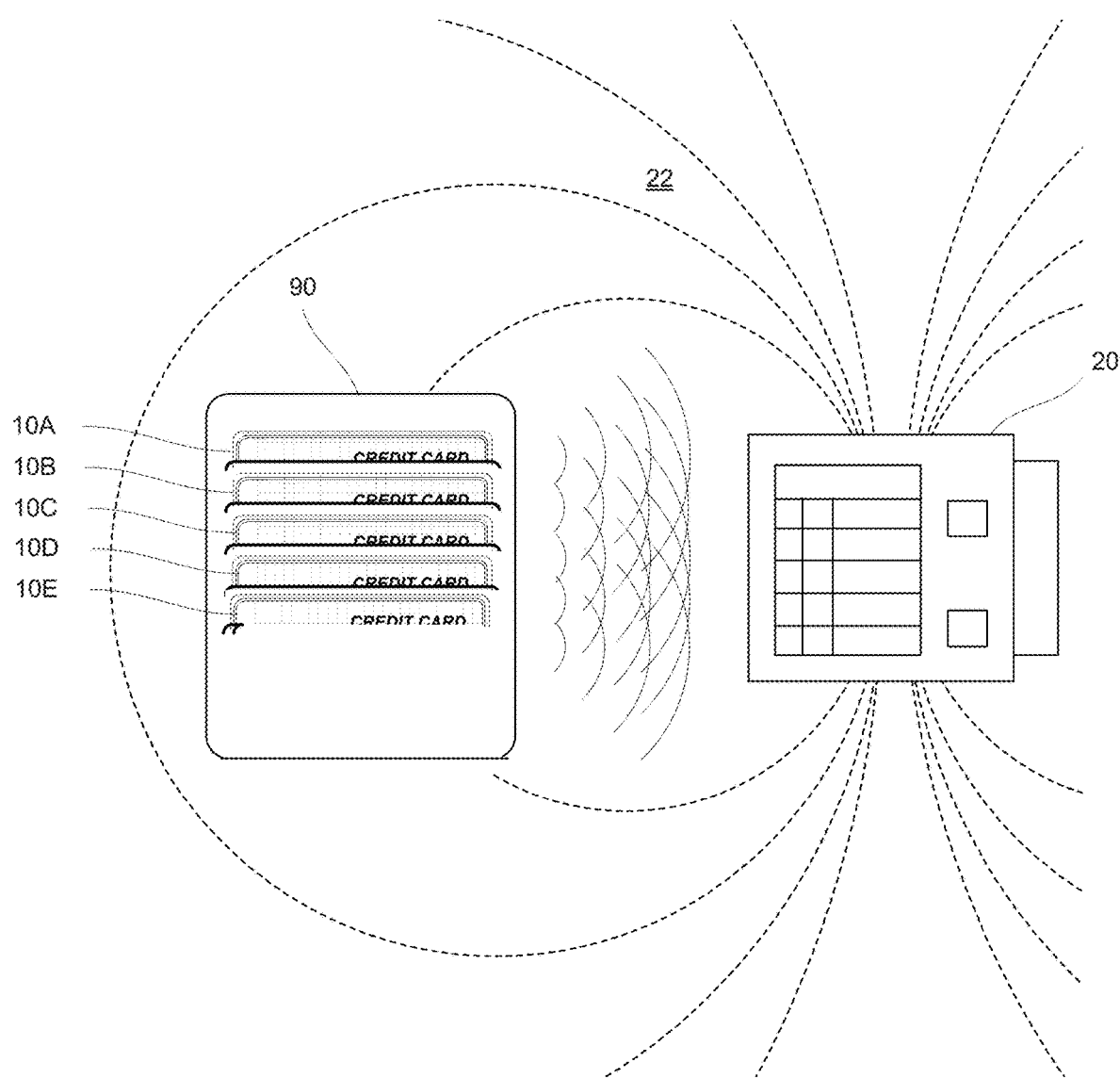
FIG. 4 is a schematic illustration of an operating transaction processing device and a card case having a plurality of NFC-capable transaction cards stored therein.

NFC-based transactions are highly convenient for the user because the transaction card 10 need only be brought to within NFC communication range of the merchant device 20 or user device 40 and may not require that the card 10 be removed from the user's wallet or card case. Problems occur, however, when a user places multiple NFC-enable cards 10 in close proximity to one another. FIG. 3, for example, illustrates a group of five NFC enabled cards 10A-10E that have been placed in a card wallet 90. The user may intend that transaction card 10A be used to complete a purchase transaction with a merchant transaction processing device 20. When the entire wallet 90 is immersed in the magnetic field 22 of a merchant device 20 as shown in FIG. 4, all of the cards 10A-10E may be energized, resulting in all five initiating an NFC transmission. The merchant device 20 is generally not capable of prioritizing these transmissions. If the transmissions are simultaneous, the merchant device 20 may fail to distinguish any one signal, which results in a failed transaction. If the transmissions are not simultaneous, the merchant device 20 may attempt to use the information from the first received transmission to complete the transaction. This may result in a failed transaction because the card 10 whose transmission was received may not be usable for transactions with the merchant device. An alternative result is that the transaction is completed using one of the undesired transaction cards 10B-10E rather than the intended card 10A.

The simplest approach to avoiding the above-described problem is to remove the desired transaction card 10A from the wallet 90 and bring it separately to within communication range of the merchant device 20. This, however, reduces the convenience of the NFC-enabled card. One alternative approach is to provide shielding for all of the undesired transaction cards 10B-10E so that when the collection of cards is placed in close proximity to an NFC receiver, only the desired card 10A is energized to transmit information. This approach may have significant convenience and reliability issues.

The present invention provides an approach for discriminating between NFC transmitting devices (e.g., smart transaction cards 10) by providing a desired NFC transmitting device (e.g., a particular transaction card 10A) with the capability of establishing NFC communication at a greater range than the other transmitting devices (e.g., undesired transaction cards 10B-10E), thereby assuring that communication between the desired NFC transmitting device and an NFC receiver (e.g., a merchant processing device 20 or user device 40) is established prior to any transmission by the undesired transmitting devices triggered by the same NFC receiver.

The NFC communication range within which an NFC transmitter must be brought to establish communication with an NFC receiver may be a function of the magnetic field generated by the receiver and the transmission strength of the NFC transmitter. The NFC transmission strength of typical transaction cards 10 is relatively limited so that they must be brought to within two to three inches of a receiver to establish NFC communication.

Embodiments of the present invention provide devices that can be removably connected to an NFC-enabled transaction card 10 or other NFC transmitting device for increasing the range at which the card 10 or other device may establish NFC communication with a receiver. In some embodiments, a range extension device may be removably attachable to an NFC-enabled transaction card. In other embodiments, a range extension device may be or be incorporated into a wallet or case in which an NFC-enabled transaction card may be disposed. In various embodiments, a range extension device incorporates an antenna, an amplifier, a power source, and an interface for connecting to transaction card chip circuitry.

Returning now to FIGS. 1 and 2, aspects of the transaction card 10 and transaction card processing system 50 will be discussed in mom detail. The system 50 includes one or more user devices 40, one or more transaction cards 10, a communication network 30, one or more merchant transaction processing devices 20, a cryptocurrency exchange processing system 150, and a card account processing server 25.

In the example embodiments presented herein, an account holder may be any individual or entity that desires to conduct a transaction (which may be, but is not limited to a financial transaction) with a merchant using a transaction account. An account holder user device 40 may be a mobile device or other processor that an account holder uses to carry out a transaction. An account may be held by any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, or mobile commerce account. In some instances, the account holder may be a transaction processing entity such as a financial institution, credit card provider, or other entity that offers accounts to customers. An account may or may not have an associated card, such as, for example, a credit card for a credit account or a debit card for a debit account. The account card may be associated or affiliated with a merchant or one or more social networking sites, such as a co-branded credit card.

As referred to herein, a network-enabled computer system and/or device may include, but is not limited to any computer device, or communications device including, a server, a network appliance, a personal computer (PC), a workstation, and a mobile processing device such as a smart phone, smart pad, handheld PC, or personal digital assistant (PDA). Mobile processing devices may include Near Field Communication (NFC) capabilities, which may allow for communication with other devices by touching them together or bringing them into close proximity. Mobile devices may also include other range-limited communication capabilities such as Bluetooth.

The network-enabled computer systems used to carry out the transactions contemplated in the embodiments may execute one or more software applications to, for example, receive data as input from an entity accessing the network-enabled computer system, process received data, transmit data over a network, and receive data over a network. The one or more network-enabled computer systems may also include one or more software applications to notify an account holder based on transaction information. It will be understood that the depiction in FIG. 1 is an example only, and the functions and processes described herein may be performed by any number of network-enabled computers. It will also be understood that where the illustrated system 50 may have only a single instance of certain components, multiple instances of these components may be used. The system 50 may also include other devices not depicted in FIG. 1.

The network 30 may be any form of communication network capable of enabling communication between the transaction entities and the card processing system 50. For example, the network 30 may be one or more of a wireless network, a wired network or any combination of wireless network and wired network. The network 30 may be or include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 30 may utilize one or more protocols of one or more network elements to which it is communicatively coupled. The network 30 may translate to or from other protocols to one or more protocols of network devices. Although the network 30 is depicted as a single network, it will be appreciated that it may comprise a plurality of interconnected networks, such as, for example, the Internet, a service provider's network, a cable television network, corporate networks, and home networks.

Figure 5:
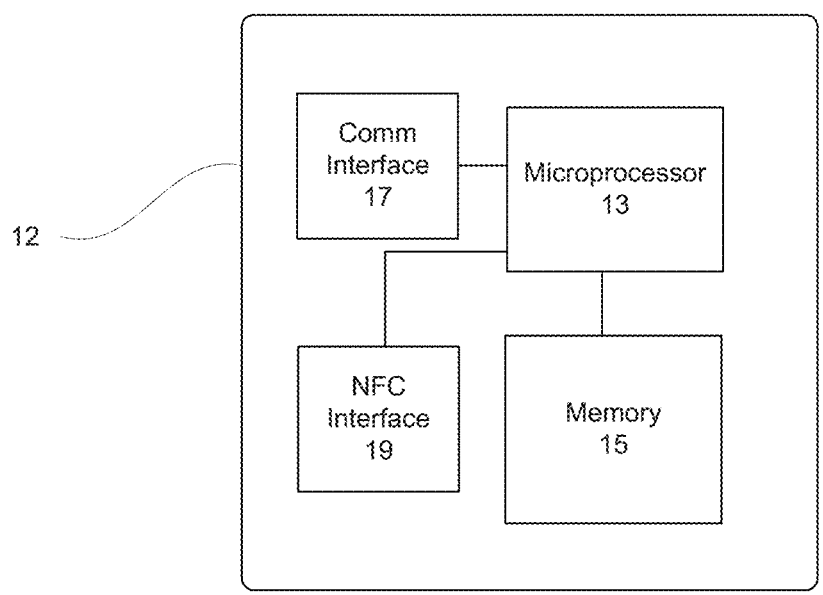
FIG. 5 is a block diagram of a data processing chip of a transaction card usable in conjunction with embodiments of the invention.

The transaction cards 10 used in methods of the invention may include chip-carrying transaction cards ("smart" cards) having electrical and/or near field or other short range communication capabilities. As illustrated in FIGS. 1 and 2, a typical transaction card 10 that is usable in various embodiments of the invention is a smart card with a microprocessor chip 12. The microprocessor chip 12 includes processing circuitry for storing and processing information, including a microprocessor 13 and a memory 15. (See FIG. 5.) It will be understood that the processing circuitry may contain additional components, including processors, memories, error and parity/CRC checkers, data encoders, anticollision algorithms, controllers, command decoders, security primitives and tamper-proofing hardware, as necessary to perform the functions described herein.

The transaction card 10 is configured for communication with transaction terminals and other device via a first communication interface 17. The interface 17 and the microprocessor 13 may, in particular, be configured for establishing communication with merchant transaction processing devices 20 for carrying out purchase and other transactions. The communication interface 17 may be configured to provide for contact-based communication, in which case the interface 17 may have electrical circuitry and contact pads 16, 18 on the surface of the card 10 for establishing direct electrical communication between the microprocessor 13 and the processing circuitry of a transaction terminal 20.

The transaction card 10 may also be configured for contactless communication with the transaction terminals 20 and/or a user device 40. In such embodiments, the card 10 may include an NFC communication interface 19 configured for communication with other NFC communication devices when the card 10 is within a predetermined NFC range. The NFC interface 19 may include an antenna 14 configured for powering the chip 12 and establishing NFC communication when the card 10 is immersed in the magnetic field of an NFC receiver. In some embodiments, the microprocessor chip 12 may include an additional communication interface (not shown) configured for establishing short range communication with the user device 40 via Bluetooth, or other short range communication methodology. A Bluetooth-enabled transaction card 10 may support Bluetooth Low Energy (BLE) and may be paired to the user device 40. In some embodiments, pairing and communications may be established between the transaction card 10 and other interfacing devices, such as a terminal (not shown), a merchant transaction processor 20, and the like. A Bluetooth-enabled device may include the capabilities to establish a link between a card and the device (or pair the devices) using device settings (e.g., iOS or Android settings that manage Bluetooth connections) and/or mobile application(s) associated with the card issuer that can cooperate with the device controls to manage a Bluetooth connection with the card 10.

The memory IS may be a read-only memory, write-once read-multiple memory or read/write memory, e.g., RAM, ROM, and EEPROM, and the chip 12 may include one or more of these memories. The memory 15 may have stored therein information associated with a transaction card account. In some embodiments, the memory 15 may have permanently stored therein a unique alphanumeric identifier associated with the account. It may also have permanently stored public and private card encryption keys. In some embodiments, the private and public encryption keys may be permanently hard-wired into the card memory.

The memory 15 may be a read-only memory, write-once read-multiple memory or read/write memory, e.g., RAM, ROM, and EEPROM, and the chip 12 may include one or more of these memories. The memory 15 may be configured to store one or more software applications for execution by the microprocessor 13. Information associated with an account may also be stored in the memory 15. In particular, the memory 15 may have stored therein a unique alphanumeric customer identifier assigned to the card. The memory 15 may further include instructions for the microprocessor 13 to respond to activation as a result of interaction with a merchant device 20 or user device 40. Such interaction may be by a physical circuit connection (e.g., through insertion of the card into a receiving slot so that the contact pads 16, 18 engage complementary contacts of the merchant device 20 or user device 40) or via immersion in the magnetic field of an NFC receiver (e.g., an NFC interface of the merchant terminal 20 or user device 40). The activation response may be or include transmitting to the receiving device via the communication interface 17 or the NFC interface 19 information required by the receiving device to complete a transaction. This information may include identification of a transaction account associated with the transaction card 10.

Figure 6:
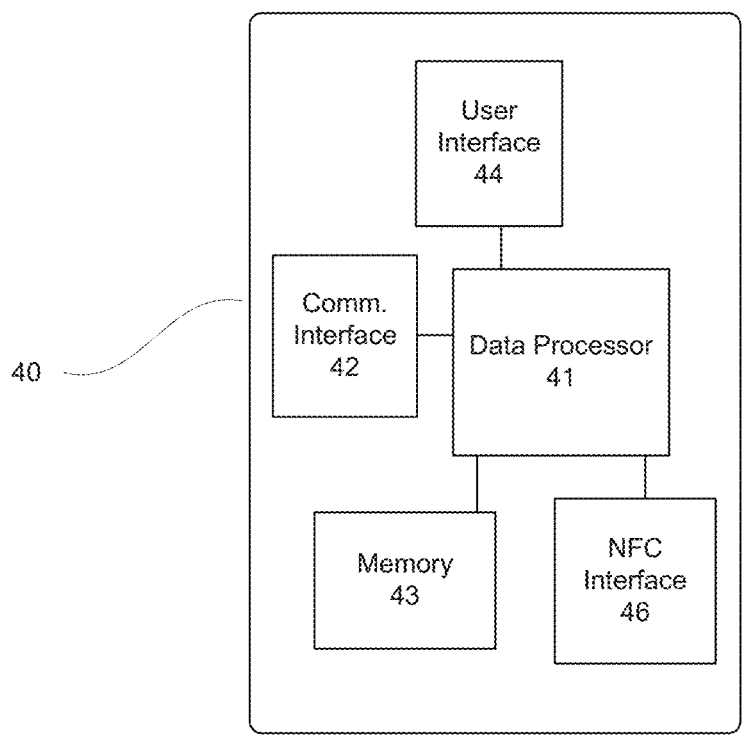
FIG. 6 is a block diagram of a user data processing device usable in conjunction with embodiments of the invention.

The user device 40 may be any computer device or communications device including a server, a network appliance, a personal computer (PC), a workstation, and a mobile interface device such as a smart phone, smart pad, handheld PC, or personal digital assistant (PDA). With reference to FIG. 6, the user device 40 includes an on-board data processor 41 in communication with a memory module 43, a user interface 44, a network communication interface 42, and an NFC interface 46. The data processor 41 may include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 43 can be a read-only memory, write-once read-multiple memory or read/write memory, e.g., RAM, ROM and EEPROM, and the user device 40 can include one or more of these memories.

The user interface 44 of the device 40 includes a user input mechanism, which can be any device for entering information and instructions into the user device 40, such as a touch-screen, keyboard, mouse, cursor-control device, microphone, stylus, or digital camera. The user interface 44 may also include a display, which can be any type of device for presenting visual information such as a computer monitor, a flat panel display, and a mobile device screen, including liquid crystal displays, light-emitting diode displays, plasma panels, and cathode ray tube displays.

The network communication interface 42 is configured to establish and support wired or wireless data communication capability for connecting the device 40 to the network 30 or other communication network. The NFC interface 46 is configured for establishing near field communication with other NFC-enabled devices. In some embodiments, the NFC interface 46 may be used to establish communication with a merchant transaction terminal 20 or the data processing chip 12 on board the transaction card 10. The NFC interface 46 may, in particular, include an NFC receiver configured to generate a magnetic field for activation of passive NFC transmitters and for receiving information transmitted thereby. In some embodiments, the NFC interface 46 may further include an NFC transmitter.

In embodiments of the invention, the memory 43 may have stored therein one or more applications usable by the data processor 41 to conduct and/or monitor transactions and communications between the user device 40, the transaction card 10, the merchant transaction processing devices 20, and the card account processor 25 over the network 30. These applications may include instructions usable by the data processor 41 to identify transaction events, store event data in the memory 43, and communicate event data to various systems. Some applications may also include instructions relating to receiving and interpreting instructions from other systems.

In various embodiments, the memory 43 may include a transaction card account application configured for facilitating transactions using the transaction card 10. This application may include instructions for transmitting and receiving account information to and from the card account processor 25. The application may further include instructions for displaying information to the account holder/user and receiving input or instructions from the account holder/user. The transaction application may include instructions for communicating directly with a merchant terminal 20 or the card account processor 25 for conducting transactions.

The memory 43 may further have stored therein an NFC application comprising a plurality of instructions usable by the data processor 41 to establish communication with an NFC transmission device (e.g., of the transaction card 10 or of a passive NFC tag) via the user device NFC interface 46.

The merchant transaction processing devices 20 may be any network enabled processors configured for processing a transaction involving the transaction card 10. As used herein, a merchant is any entity with which an account holder carries out a transaction. This may include without limitation any retailer, wholesaler, or bartering entity. A merchant may have one or more physical locations or may be an online retailer. The merchant transaction processing device 20 may be any network enabled device (e.g., cash register or other POS terminal or an on-line transaction server) that is capable of communicating with the transaction card 20 (e.g., by contact-based electrical communication or by NFC communication) or otherwise receiving transaction card information for carrying out a transaction and is capable of communicating with the card account processor 25 via the network 30. In particular embodiments, the merchant processor 20 includes an NFC receiver configured for generating a magnetic field for activation of transaction card functionality and for establishing NFC communication with the activated card.

In an exemplary transaction scenario carried out with the transaction processing system 50, a card account holder wishing to complete a purchase transaction at a merchant processing terminal 20 may bring a transaction card 10 to within NFC communication range of the terminal 20. Upon immersion within the magnetic field 22 of the merchant terminal 20, a current is generated within the circuitry of the transaction card 10 sufficient to activate the microprocessor 13, which causes the NFC interface 19 to transmit card information retrieved by the microprocessor 13 from the memory 15. If the transaction card 10 is within close enough proximity to the NFC receiver of the merchant terminal 20, the merchant terminal 20 receives the card information, which it can then use to complete the transaction. In some cases the merchant terminal 20 may transmit the card information to the transaction processing server 25 to verify the validity and/or usability of the account associated with the card 10 and to further process the transaction.

In some cases the merchant terminal 20 may be configured to indicate that the transaction has not been processed. This may occur for any of various reasons including a determination that the card 10 from which information has been received is not valid for completing the transaction.

As previously discussed, users of NFC-enabled transaction cards may not want to withdraw a card 10 from their card case or wallet when completing a transaction such as that described in the above scenario. This can result in multiple transaction cards 10 transmitting in response to activation by the merchant terminal 20 and a consequent negative response to the users attempt to complete the transaction. It can also result in the inadvertent usage of an undesired card 10 to complete the transaction.

To overcome this problem, embodiments of the present invention provide a range extension device that can be connected to a transaction card 10 or to other passive NFC transmitters. The effect of the range extension device is to provide the connected transaction card 10 with an extended NFC communication range. When the connected card 10 and other accompanying cards 10 are moved toward a receiving transaction terminal 20 (or user device 40), the extended range results in establishment of NFC communication between the connected card 10 and the receiving terminal 20 (or user device 40) before the accompanying transaction cards 10 are within communication range.

Figure 7:
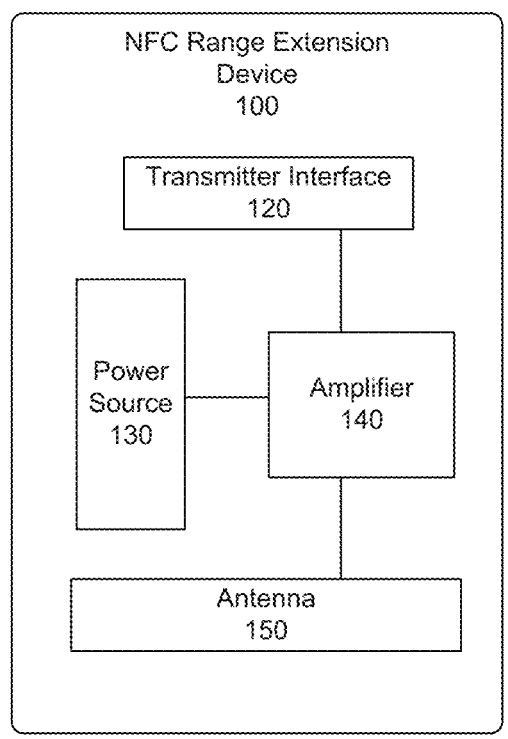
FIG. 7 is a block diagram of an NFC range extension device according to an embodiment of the invention.

With reference to FIG. 7, range extension devices 100 according to embodiments of the invention include a transmitter interface 120, a power source 130, an amplifier 140, and an antenna 150. The transmitter interface 120 is configured to receive transmission signals from the transaction card 10 and pass them to the amplifier 140. In particular embodiments, the transmitter interface 120 may be or include a physical interface configured for connecting the circuitry of the range extender 100 to the transmission circuitry of the transaction card 10. In other embodiments, the transmitter interface 120 may be configured to wirelessly receive transmitted signals from the NFC interface 19 of the transaction card 10. The amplifier 140 is powered by the power source 130 and is configured to receive and amplify the transmitted signal and re-transmit it via the antenna 150.

Figure 8A:
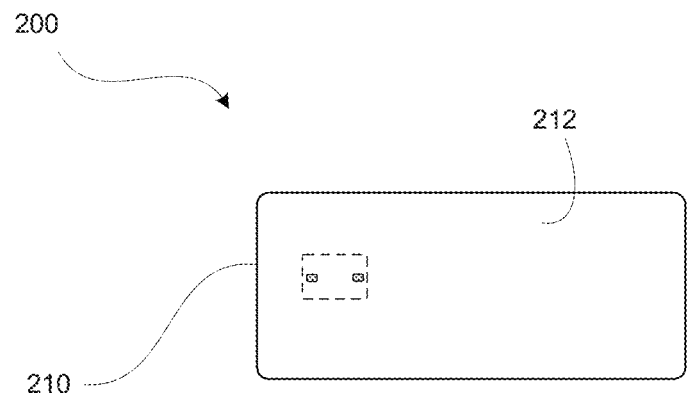
FIG. 8A is a top view representation of an NFC range extension device according to an embodiment of the invention.
Figure 8B:
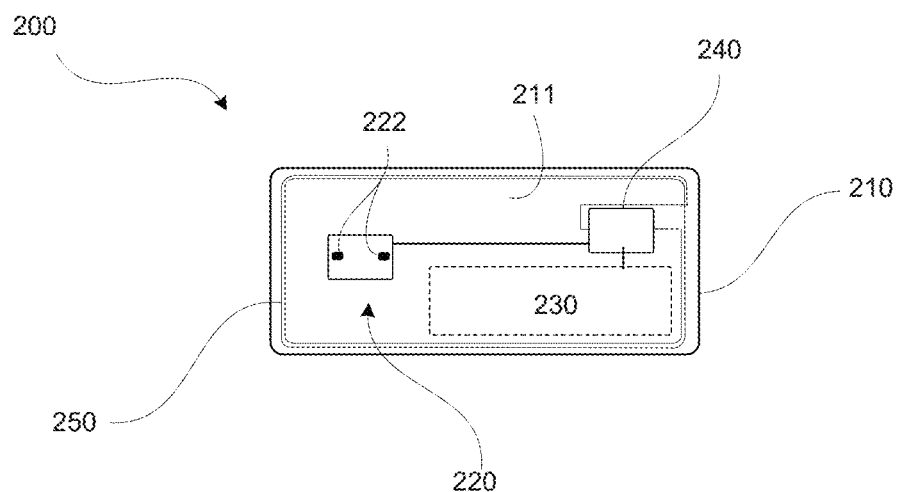
FIG. 8B is a bottom view representation of the NFC range extension device of FIG. 8A.
Figure 9:
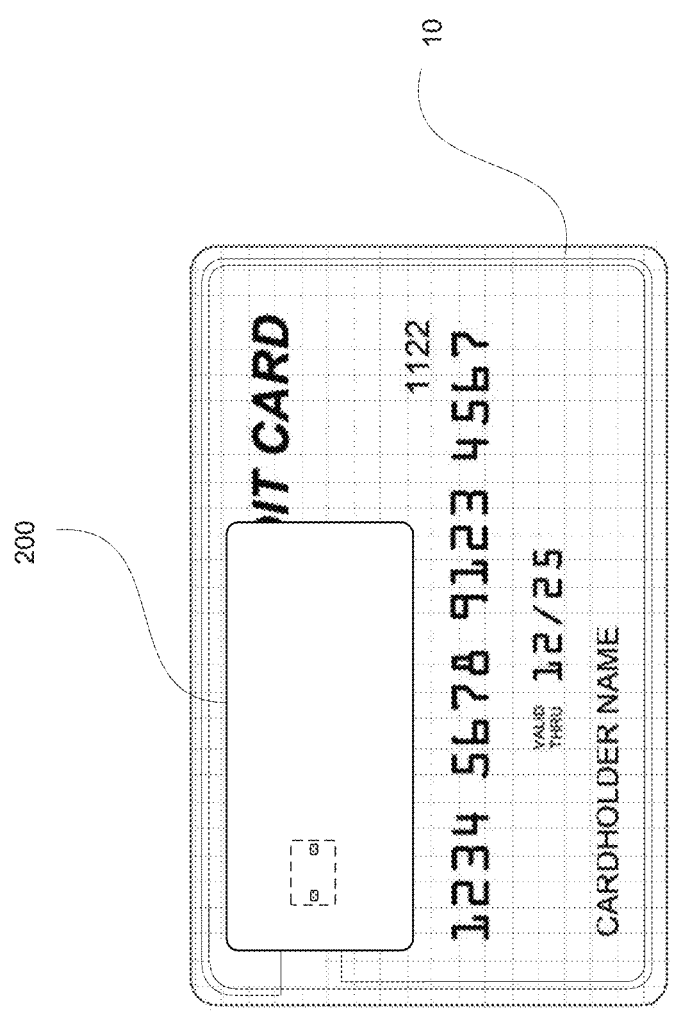
FIG. 9 is a top view illustration of the NFC range extension device of FIG. 8A in a transmission receiving configuration relative to an NFC-enabled transaction card.

With reference to FIGS. 8 and 9, an NFC range extension device 200 according to certain embodiments of the invention includes a planar body member 210 having a lower surface 211 and an upper surface 212. The body member 210 may be formed from any non-conductive material. In typical embodiments, the body member 210 is formed from a rigid or non-rigid plastic material. The range extension device 200 further includes a transmitter interface 220, a power source 230, an amplifier 240, and an antenna 250, each attached to or embedded within the body member 210. In particular embodiments, one or both of the power source 230 (e.g., an ultrathin battery) and amplifier 240 are embedded entirely within the body member 210. In some embodiments, one or both of the power source 230 (e.g., an ultrathin battery) and amplifier 240 are positioned within a depression in the lower surface 211 so that they do not extend outward past the lower surface 211. The transmitter interface 220 includes one or more contacts 222 configured to engage the contacts 16, 18 of a transaction card 10 when the lower surface 211 of the range extender 200 is placed over the surface of the transaction card 10 as shown in FIG. 9. With the range extender 200 so positioned and engagement with the transaction card 10, the transmitter interface 220 is in electrical communication with the card chip 12 whereby NFC signals transmitted via the card NFC interface 19 are received via the transmitter interface 220, amplified by the amplifier 240 and retransmitted via the antenna 250.

The range extender 200 may be held in the above-described retransmission configuration by any of various means. In particular embodiments, the range extender 200 may be removably attached to the transaction card 10 in the retransmission configuration. In some such embodiments, the body member 210 may be configured as a pad removably attachable to the transaction card body member 11 by a pressure sensitive adhesive. In other embodiments, an attachment mechanism such as a strap or one or more clips could be used to hold the range extender 200 in place.

In the illustrated embodiment, the body member 210 is sized to allow card information to be visible when the range extender 200 is attached. It will be understood, however that the body member 210 is not limited to such dimensions. In some embodiments, the body member 210 may be sized so as to have dimensions similar to those of the planar body of the transaction card 10. This may facilitate positioning and attachment of the range extender 200 with the contacts 222 engaging the card contacts 16, 18.

Figure 10:
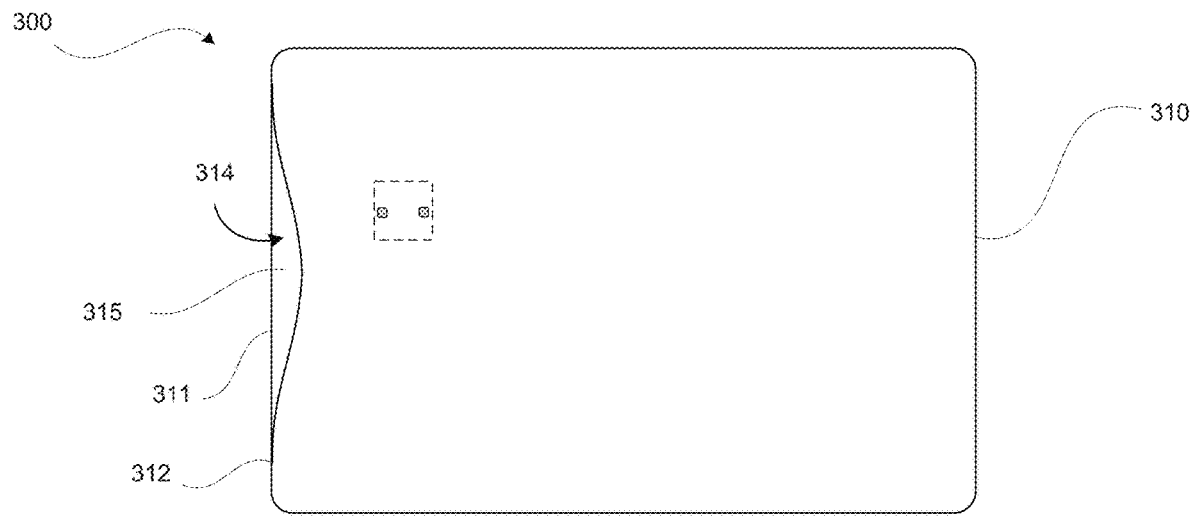
FIG. 10 is a top view representation of an NFC range extension device according to an embodiment of the invention.
Figure 11:
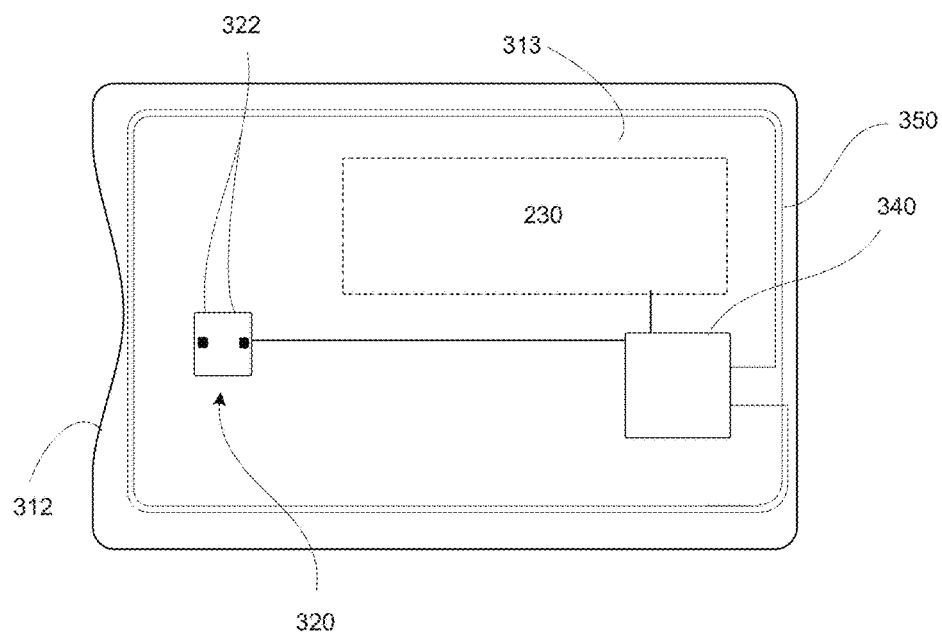
FIG. 11 is a bottom view of a portion of the NFC range extension device of FIG. 10.
Figure 12:
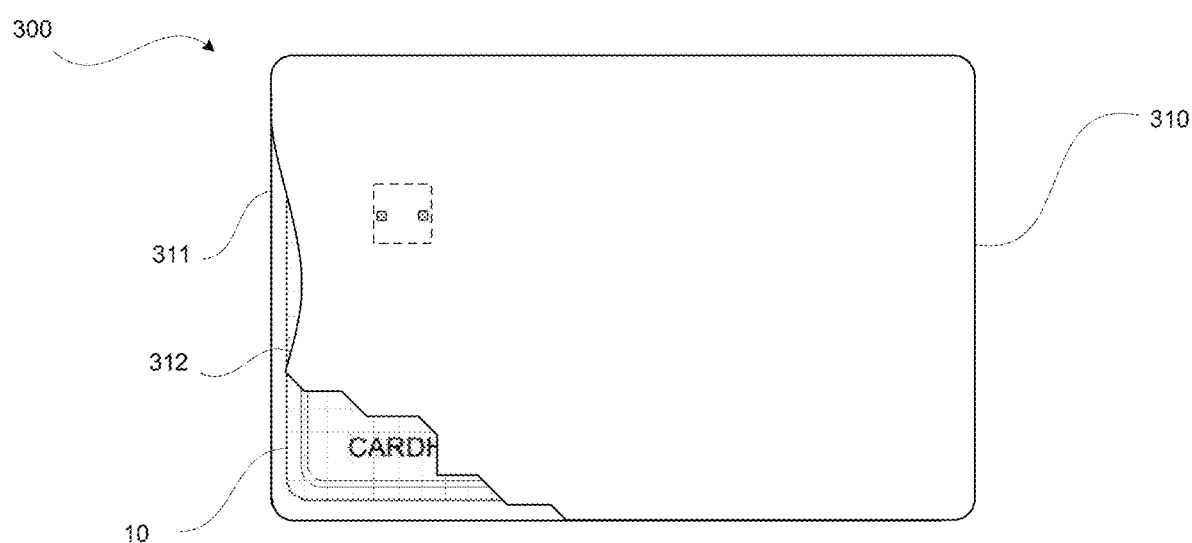
FIG. 12 is a top view illustration of the NFC range extension device of FIG. 11 and an NFC-enabled transaction card.

With reference to FIGS. 10-12, a range extension device 300 according to another exemplary embodiment includes a card case 310 formed from a lower case member 311 and an upper case member 312. The upper and lower case members 311, 312 may be formed as flexible substantially planar members placed in registration and joined to one another so as to form a rectangular pocket 314 with an opening 315. The pocket 314 and opening 315 are sized to receive and position a transaction card 10 as shown in FIG. 12. As shown in FIG. 11, the upper case member 312 has an inside surface 313 on which a transmitter interface 320 is disposed. The transmitter interface 320 includes one or more contacts 322 configured to engage the contacts 16, 18 of the transaction card 10 when the transaction card 10 is filly received into the case pocket 314 as shown in FIG. 12.

The range extension device 300 further includes a power source 330, an amplifier 340, and an antenna 350, each of which may be attached to or embedded within the upper body member 312. In particular embodiments, one or both of the power source 330 (e.g., an ultrathin battery) and amplifier 340 are embedded entirely within the upper body member 312. In some embodiments, one or both of the power source 330 (e.g., an ultrathin battery) and amplifier 340 are positioned within a depression in the inner surface 313 of the upper body member 312 so that they do not extend outward past the lower surface 313. In still other embodiments, any or all of the power source 330, the amplifier 340 and the antenna 350 may be positioned on the outside surface of the upper body member or may be attached to the lower body member 311.

When a transaction card has been received into the pocket 314 of the range extender 300 so that the contacts 322 are in contact with the card contacts 16, 18, the transmitter interface 320 is in electrical communication with the card chip 12 whereby NFC signals transmitted via the card NFC interface 19 are received via the transmitter interface 320, amplified by the amplifier 340 and retransmitted via the antenna 350.

Figure 13:
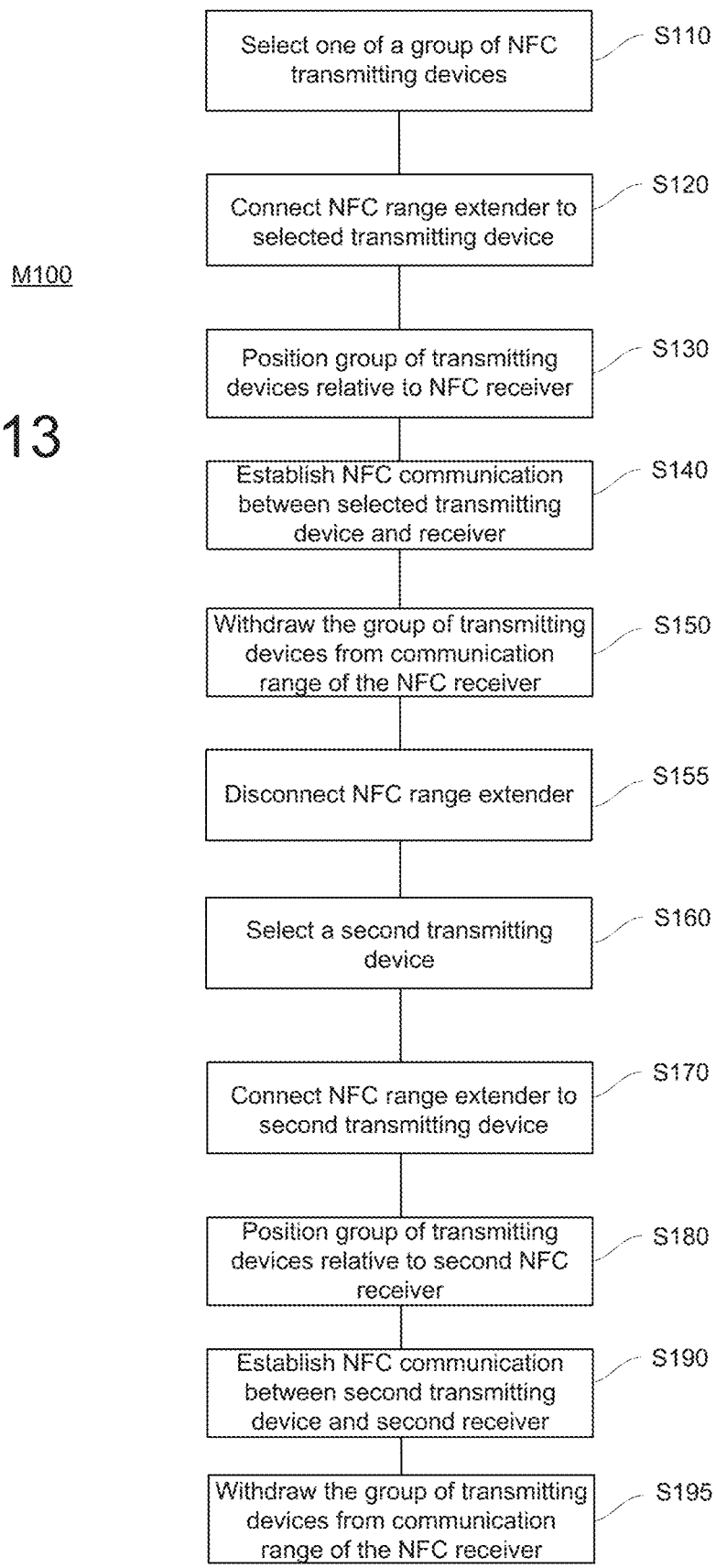
FIG. 13 is a flow chart of actions in a method of differentiating one of a group of unpowered NFC transmitting devices.

FIG. 13 illustrates a method M100 of differentiating one of a group of unpowered NFC transmitting devices for use in establishing NFC communication with an NFC receiving device. As used herein, the term "unpowered" as applied to an NFC transmitting device means that the transmitting device has no power source other than the current generated by immersion of the device in a magnetic field. The individual transmitters each have a baseline NFC communication range that is less than or equal to a maximum baseline range for the group. At S110 of the method M100, one of the collocated NFC transmitters is selected by a user. This may include, for example, the selection of a particular NFC-enabled transaction card by an account holder from a group of transaction cards the account holder keeps in his or her wallet. At S120, the user connects an NFC range extender having the features of the range extender 100 of FIG. 7 to the selected transmitting device. This effectively increases the NFC communication range for the selected transmitting device to an extended range that is greater than the maximum baseline range for the group of transmitting devices.

For instances where the NFC transmitting device is or includes a smart transaction card, the action of connecting the range extender may include positioning the range extender so that its transmitter interface is in electrical communication with the NFC interface of the transaction card. For embodiments in which the range extender comprises a single planar body member (e.g., the range extender 200 of FIGS. 8 and 9), this may include positioning the body member over the face of the transaction card so that the contacts of the range extender's transmitter interface are in contact with the contacts of the transaction card and removably attaching the range extender to the transaction card. For embodiments in which the range extender is formed as a card case (e.g., the range extender 300 of FIGS. 10-12), the action of connecting may be or include removably inserting the transaction card into the card case so that the contacts of the range extender's transmitter interface are in contact with the contacts of the transaction card.

At S130, the transmitting device group is positioned for communication with the NFC receiving device. In doing so, the transmitting device group is immersed into the magnetic field established by the receiving device and brought to within a distance from the receiving device that is less than the extended communication range of the selected transmitting device but greater than the maximum baseline communication range of the group. It will be understood that the action of positioning may be accomplished either by moving the group of transmitting devices relative to a stationary receiving device (e.g., a merchant terminal) or by moving a receiving device (e.g., a user's mobile device) relative to a stationary group of NFC transmitting devices.

At S140 of the method M100, NFC communication is established between the selected transmitting device and the receiving device. This may occur upon the transmitting device group reaching the position relative to the receiving device where the distance between the group and the receiving device is less than or equal to the extended communication range of the selected transmitting device. Notably, at this range, none of the other transmitting devise will be able to establish NFC communication with the receiver. In the instances where the selected transmitting device is a desired transaction card, the NFC communication may result in the submission of transaction card information usable by the receiver to process or complete a transaction.

It will be understood that in positioning the group of transmitting devices, the transmitting devices may be brought to within a closer proximity to the receiver such that the distance between the group and the receiver is less than the baseline NFC communication range of one or more of the non-selected transmitting devices. In such instances, however, the group must first pass through a distance interval in which the selected transmitting device is within communication range and the non-selected transmitting devices are not. Accordingly, the selected transmitting device will always be able to initiate NFC communication before any of the non-selected transmitting devices.

At S150 the group of NFC transmitting devices is withdrawn from its relative position in proximity to the receiving device to a position outside communication range of all of the transmitting devices. The basic method M100 may be terminated after this action. In an extended version of the method M100, however, the user may switch the NFC range extender from one selected transmitting device to another. This may occur at any later time after the action of withdrawing. In particular scenarios, however, the user may wish to immediately make the switch. This could be the case, for example, in an instance where a merchant terminal rejects a selected transaction card and the user wants to proceed with a different card.

At S155, the NFC range extender is disconnected from the originally selected transmitting device, thereby reducing its communication range back to its baseline level. In embodiments where the transmitting device is a transaction card, this action may include disengaging the range extender from electrical communication with the transaction card's NFC interface. Depending on the specific embodiment, this may mean detaching a planar body member of the range extender from the card face or removing the card from an enclosure (e.g., pocket, sleeve or rigid case). At S160, the user selects a second one of the group of transmitting devices and, at S170, operatively connects the NFC range extender to the second transmitting device, thereby establishing an extended range for the second selected device that is greater than the maximum baseline communication range of the group. At S180, the group of transmitting devices is positioned relative to a second NFC receiver (which may be the same as the original receiver). As before, this may include immersing the transmitting device group in the magnetic field established by the receiving device and bringing it to within a distance from the receiving device that is less than the extended communication range of the second selected transmitting device but greater than the maximum baseline communication range of the group. At S190, NFC communication is established between the second transmitting device and the second receiving device. In instances where the selected NFC transmitting device is a transaction card, this may include transmission of transaction card information usable by the receiving device to process or complete a transaction.

It will be understood that the actions S155 to S195 may be repeated any number of times.

The methods and systems of the present invention provide the capability of preselecting/designating an NFC transmitting device from a group of transmitting devices in a manner that discriminates that transmitting device when the group is placed within communication range of an NFC receiving device. This eliminates the need for the user to physically separate the transmitting devices to assure that NFC communication is established with the selected transmitting device without interference by or confusion with NFC transmissions from other transmitting devise of the group.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. A method of differentiating one of a plurality of unpowered near field communication (NFC) transmitting devices for use in establishing NFC communication with an NFC receiving device, each NFC transmitting device having a body member, a data processor, a memory, an antenna, and a transmitter NFC interface and having an NFC communication range, the method comprising: providing a range extending device having a power source, a transmitter communication interface configured for engaging the transmitter NFC interface, a range extender antenna, and an amplifier configured for amplifying an NFC transmitting device signal when the range extending device is connected to one of the NFC transmitting devices and said NFC transmitting device is activated by an NFC receiving device; selecting one of the plurality of NFC transmitting devices; removably connecting the range extending device to the selected NFC transmitting device so that the transmitter communication interface engages the transmitter NFC interface of the selected transmitting device, thereby establishing an extended communication range for the selected NFC transmitting device; positioning the plurality of NFC transmitting devices at a first distance from a first NFC receiving device, the distance being within the extended communication range, but outside the communication ranges of the others of the plurality of NFC transmitting devices; and establishing NFC communication between the selected NFC transmitting device and the first NFC receiving device, wherein the range extending device is or comprises an adhesive pad having at least a portion of the transmitter communication interface attached thereto, the adhesive pad being configured to be removably attachable to the body member of the selected NFC transmitting device so that the at least a portion of the transmitter NFC interface engages the transmitter communication interface.

2. A method according to claim 1 further comprising:
disconnecting the range extending device from the selected NFC transmitting device;
selecting a second one of the plurality of NFC transmitting devices;
removably connecting the range extending device to the second selected NFC transmitting device so that the transmitter NFC interface engages the transmitter interface of the second selected transmitting device, thereby establishing a second extended communication range for the second selected NFC transmitting device; and
positioning the plurality of NFC transmitting devices at a second distance from a second NFC receiving device, the second distance being within the second extended communication range, but outside the communication ranges of the others of the plurality of NFC transmitting devices; and
establishing NFC communication between the second selected NFC transmitting device and the second NFC receiving device.

3. A method according to claim 1 wherein the first NFC receiving device and the second NFC receiving device are the same.

4. A method according to claim 1 wherein at least the selected one of the NFC transmitting device is a transaction card.

5. A method according to claim 4 wherein each of the NFC transmitting devices is a transaction card.

6. A method according to claim 4 wherein the range extending device comprises a case configured for receiving the transaction card into an interior space thereof, the transmitter communication interface being positioned within said interior space so that it is engaged by the transmitter NFC interface of the transaction card when the transaction card is received into the interior space.

7. A method of extending a near field communication (NFC) range of an unpowered NFC transmitting device having a body member, a data processor, a memory, an antenna, and a transmitter NFC interface, the method comprising: providing a range extending device having a power source, a transmitter communication interface configured for engaging the transmitter NFC interface, and an amplifier configured for amplifying an NFC transmitting device signal when the range extending device is connected to the NFC transmitting device and the NFC transmitting device is activated by an NFC receiving device; and connecting the range extending device to the selected NFC transmitting device so that the transmitter communication interface engages the transmitter NFC interface of the selected transmitting device, thereby establishing an extended communication range for the NFC transmitting device, wherein the range extending device is or comprises an adhesive pad having at least a portion of the transmitter communication interface attached thereto, the adhesive pad being configured to be removably attachable to the body member of the NFC transmitting device so that the at least a portion of the transmitter NFC interface engages the transmitter communication interface.

8. A method according to claim 7 further comprising:
positioning the NFC transmitting devices at a first distance from a first NFC receiving device, the distance being within the extended communication range, but outside the NFC range; and
establishing NFC communication between the selected NFC transmitting device and the first NFC receiving device.

9. A method according to claim 8 further comprising:
disconnecting the range extending device from the NFC transmitting device.

10. A method according to claim 8 wherein the NFC transmitting device is a transaction card.

11. A method according to claim 10 wherein the range extending device comprises a housing configured for receiving the transaction card into an interior space thereof, the transmitter communication interface being positioned within said interior space so that it is engaged by the transmitter NFC interface of the transaction card when the transaction card is received into the interior space.

12. A range extension device for use in conjunction with an unpowered near field communication (NFC) transmitting device having a body member, a data processor, a memory, an antenna, and a transmitter NFC interface, the range extension device comprising: a transmitter engagement body; a power source; a transmitter communication interface disposed on the transmitter engagement body and configured for engaging the transmitter NFC interface; a range extender antenna; and an amplifier connected to the power source and the range extender antenna, the amplifier and the range extender antenna being collectively configured to receive and amplify an NFC transmitting device signal when the range extending device is connected to the NFC transmitting device and the NFC transmitting device is activated by an NFC receiving device, wherein the body member is or comprises a substantially planar pad member configured for removable attachment to the body member of the NFC transmitting device, the transmitter communication interface is disposed on an engagement surface of the pad member so that the transmitter communication interface engages the transmitter NFC interface when the pad member is attached to the body member of the NFC transmitting device, and an adhesive layer on at least a portion of the engagement surface of the pad member.

13. A range extension device according to claim 12 wherein the transmitter engagement body comprises a housing defining an interior space, the housing being sized and configured for to receive the NFC transmitting device into the interior space.

14. A range extension device according to claim 12 wherein the transmitter communication interface is positioned on a wall of the interior space so that when the NFC transmitting device is received into the interior space, the transmitter communication interface engages the transmitter NFC interface of the NFC transmitting device thereby establishing communication between the range extension device and the NFC transmitting device.

15. A range extension device according to claim 14 wherein the body member of the NFC transmitting device is a substantially planar card and the housing is formed as a sleeve configured for slidable reception of the body member therein.

* * * * *